US006547258B2

(12) United States Patent
Mandokoro et al.

(10) Patent No.: US 6,547,258 B2
(45) Date of Patent: Apr. 15, 2003

(54) OPENING AND CLOSING CHUCK

(75) Inventors: Jiro Mandokoro, Tsukuba-gun (JP); Hiroshi Hanne, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 7 days.

(21) Appl. No.: 09/983,163

(22) Filed: Oct. 23, 2001

(65) Prior Publication Data

US 2002/0067007 A1 Jun. 6, 2002

(30) Foreign Application Priority Data

Dec. 5, 2000 (JP) ....................................... 2000-370413

(51) Int. Cl.7 ........................... B23B 31/30; B25J 15/08

(52) U.S. Cl. .......................... 279/4.12; 269/43; 269/95; 269/101; 279/110; 279/117; 279/123; 294/88; 294/119.1; 901/31; 901/37

(58) Field of Search ................................ 279/110, 117, 279/2.09, 4.1–4.12, 123; 294/88, 119.1; 901/30, 31, 32, 36, 37, 38, 39; 269/285, 43, 95, 101, 309, 227

(56) References Cited

U.S. PATENT DOCUMENTS 1,120,649 A * 12/1914 De Leuuw .................. 269/101
3,782,742 A * 1/1974 Fink et al. .................. 279/110
4,550,922 A * 11/1985 Hall et al. .................. 279/110
5,839,770 A * 11/1988 Zajac, Jr. et al. ............. 294/88
4,793,053 A * 12/1988 Zuccaro et al. ............... 901/31
4,878,705 A * 11/1989 Arnquist ...................... 901/36
5,529,359 A * 6/1996 Borcea et al. ................ 294/88
6,003,431 A * 12/1999 Bertini .......................... 92/30
6,428,071 B2 * 8/2002 Bertini .................... 294/119.1

* cited by examiner

*Primary Examiner*—Steven C. Bishop
(74) *Attorney, Agent, or Firm*—Oblon, Spivak, McClelland, Maier & Neustadt, P.C.

(57) ABSTRACT

A chuck body has a first surface for fixing to a support body and a second surface opposite to the first surface, and the second surface of the chuck body is provided with a pair of chuck members for chucking a workpiece and a guide rail for guiding an open and close operation of these chuck members. Further, a plurality of stationary holes for fixing the chuck body to the support body is formed at a position overlapping with the chuck members of the guide rail so as to communicate with the first surface, and each of the chuck members is provided with a work hole for inserting a screw into these stationary holes.

4 Claims, 5 Drawing Sheets

OPENING AND CLOSING CHUCK

TECHNICAL FIELD

The present invention relates to an opening and closing chuck, which is attached to an industrial robot arm or the like, and is used for the grasping (holding) of a workpiece.

PRIOR ART

Conventionally, an opening and closing chuck having the following construction has been known as an opening and closing chuck, which is attached to an industrial robot arm or the like, and is used for the grasping of a workpiece. More specifically, the opening and closing chuck includes a pair of cylinder mechanisms, a pair of chuck members, a pinion, and one guide rail. The pair of cylinder mechanisms is located in a chuck body in parallel with each other, and the pair of chuck members is driven so as to open and close by each piston of the cylinder mechanisms. The pinion engages with a rack provided on the pair of pistons so as to synchronize their piston operation, and the guide rail is incorporated into a side where the pair of chuck members of the chuck body is arranged, in order to guide the chuck members. The pair of chuck members is opened and closed in parallel with a driving direction of the cylinder mechanisms.

In the case of attaching this type of opening and closing chuck to a support body such as a robot arm or the like, in general, the following manner is done. More specifically, a plurality of stationary holes are formed in the chuck body from the side where the pair of chuck members of the chuck body is arranged toward an attaching side opposite to there, and a fixation screw is screwed into these stationary holes.

However, the center axial line of the chuck body is the most effective in stable fixation; nevertheless, usually, the pinion is arranged on the center of the chuck body, and further, places other than above are a moving range of the chuck member having a small stroke. For this reason, even if the stationary hole is formed on the position keeping away from the pinion, the chuck member is an obstacle; as a result, it is impossible to insert the fixation screw into the stationary hole. Therefore, the stationary hold must be formed on a position such that it does not overlap with a cylinder hole of each cylinder mechanism, and is positioned outside the moving range of the chuck member. After all, the stationary hole has been frequently formed on the end side of the chuck body so as to avoid the cylinder hole, the pinion, a moving space of the chuck member.

As a result, in order to secure a space for providing the stationary hole, the chuck body must be made large by the above space, and further, the opening and closing chuck is made into a large size as a whole. This is a serious problem because it is desirable to miniaturize the opening and closing chuck.

DISCLOSURE OF THE INVENTION

As described above, the conventional opening and closing chuck is constructed in a manner that the pair of chuck members is opened and closed in parallel with a driving direction of each cylinder mechanism by the pair of cylinder mechanisms arranged in the chuck body in parallel with each other. Therefore, the technical problem of the present invention is to prevent the chuck body from being made into a large size by securing a space required for providing a stationary hole for attaching a fixation screw, and to achieve a miniaturization of the whole of opening and closing chuck.

In order to solve the above technical problem, the present invention provides an opening and closing chuck, characterized by including: a chuck body having a first surface for fixing to a support body such as a robot arm, and a second surface opposite to the first surface; a pair of cylinder mechanisms having a pair of cylinder holes formed in the chuck body in parallel with each other, and a pair of pistons freely slidable in the cylinder holes, the pair of pistons being moved to a direction opposite to each other by a reaction of fluid pressure; a pinion engaging with a rack provided in the pair of pistons, and synchronizing an operation of the pistons by its rotation; a guide rail positioned on the center portion of the second surface of the chuck body and extending along a moving direction of the pistons; a pair of chuck members arranged so as to be freely movable along the guide rail in a state of riding on the guide rail at a relative position on the second surface, and moving to a direction opposite to each other in association with the pistons; a stationary hole formed so as to communicate with the first surface penetrating through the guide rail and the chuck body at a position covered by the chuck members of the guide rail, in order to fix the chuck body to the support body by using a screw; and a work hole formed so as to be aligned with the stationary hole on a specified moving position of the chuck member at a portion covering the guide rail of the chuck member, in order to attach a screw to the stationary hole via the chuck member.

In the opening and closing chuck having the above construction, the stationary holes are formed at a position covered by the chuck members on the guide rail, further, each chuck member is provided with a work hole, and thereby, a screw can be inserted into the stationary hole via each chuck member. Therefore, there is no need of providing a space for the stationary hole at an end portion near to the chuck body in order to avoid a moving range of the chuck members, like the conventional case. As a result, the chuck body is made into a small size by the space, so that the whole of chuck can be miniaturized.

According to the preferred embodiment of the present invention, two stationary holes and the work hole of the pair of chuck members are formed at a position symmetrical to the pinion, and these stationary holes and work holes are simultaneously aligned with each other in their hole position when the pair of chuck members is synchronously moved.

According to the preferred embodiment of the present invention, the pair of chuck members individually have a recess groove into which the guide rail is fitted, and one groove wall of one chuck member and a groove wall on the opposite side of the other chuck member are individually provided with an arm extending in parallel with the guide rail. Further, each of the arms is provided with a pin, which extends from a slot formed in a hole wall of the cylinder hole into the cylinder hole so as to be abutted against the piston, and the pair of chuck members is connected to the corresponding piston via the pin and the arm.

According to another preferred embodiment, the present invention provides the opening and closing chuck, characterized in that a plurality of steel balls constituting a linear bearing is interposed between right and left groove walls of the pair of chuck members and the guide rail so as to freely roll.

DETAILED DESCRIPTION

FIG. 1 to FIG. 5 show an opening and closing chuck according to one embodiment of the present invention. The opening and closing chuck includes a substantially rectangular chuck body 1, a pair of fluid cylinder mechanisms 2A and 2B, a pair of chuck members 3 and 3, and a guide rail 4. More specifically, the pair of fluid cylinder mechanisms 2A and 2B are arranged in the chuck body 1 in parallel with each other, and the pair of chuck members 3 and 3 is driven so as to open and close by the fluid cylinder mechanisms 2A and 2B. The guide rail 4 guides the pair of chuck members 3 and 3 to a direction parallel with a driving direction of the cylinder mechanisms 2A and 2B.

The pair of cylinder mechanisms 2A and 2B includes a pair of cylinder holes 5A and 5B, pistons 6A and 6B slidably inserted in the cylinder holes 5A and 5B, and ports 18 and 19, respectively. More specifically, the pair of cylinder holes 5A and 5B are formed inside the chuck body 1 in parallel with each other, and the ports 18 and 19 supply and discharge a pressure fluid such as a compressed air to each of the cylinder mechanisms 2A and 2B. These ports 18 and 19 are formed in end members 7A and 7B closing one end side of the cylinder holes 5A and 5B, respectively. In this case, the other end sides of the cylinder holes 5A and 5B are closed by end members 8A and 8B, respectively.

In the pair of cylinder mechanisms 2A and 2B, a pressure fluid is supplied and discharged via the ports 18 and 19 of the end members 7A and 7B, and thereby, the pistons 6A and 6B are reciprocated to a direction opposite to each other.

Figure 1:
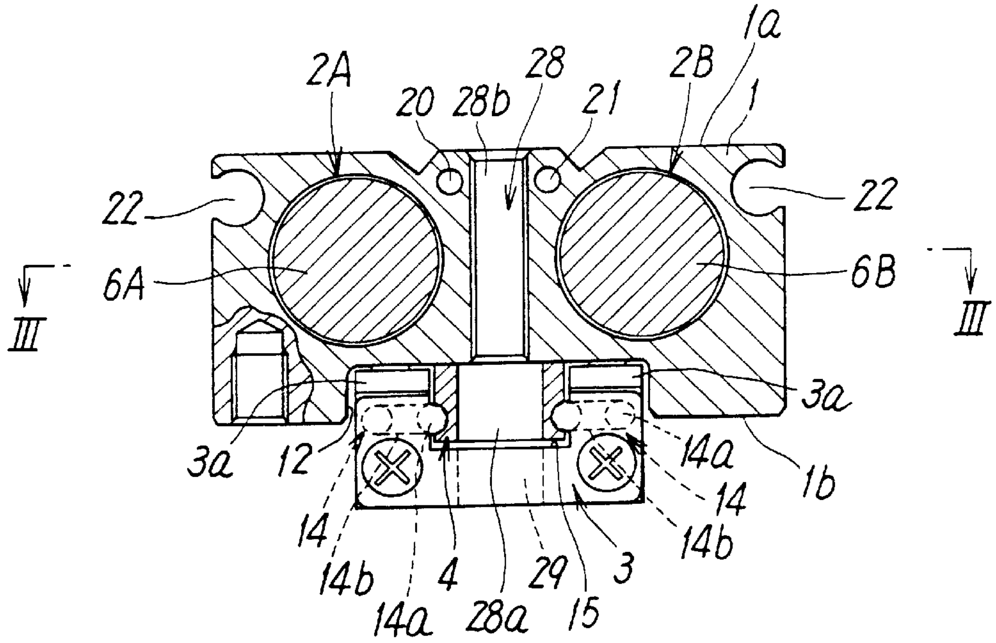
FIG. 1 shows an opening and closing chuck according to one embodiment of the present invention, and is a cross sectional view taken along the line I—I of FIG. 2.
Figure 2:
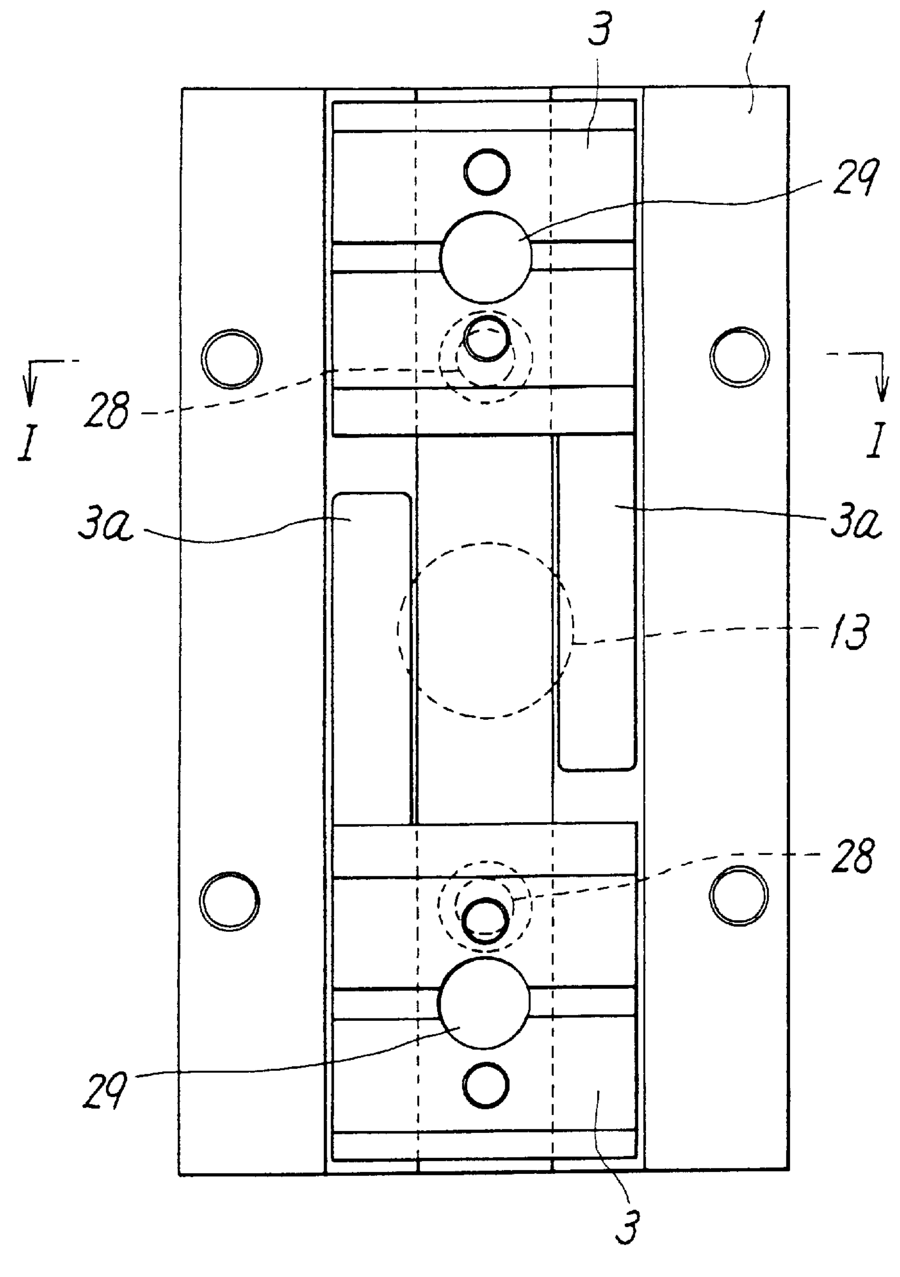
FIG. 2 is a bottom view showing the opening and closing chuck shown in FIG. 1.
Figure 3:
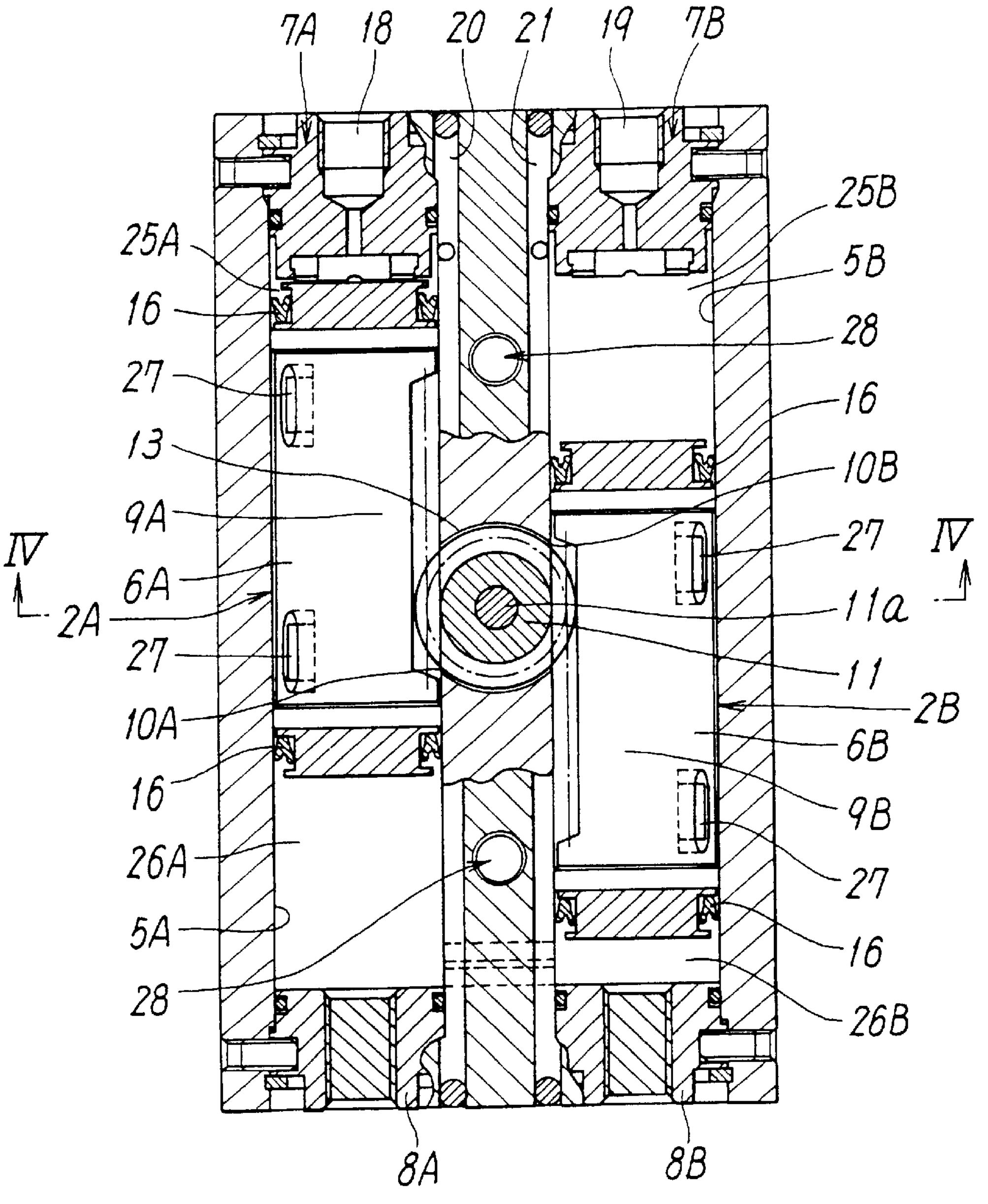
FIG. 3 is a cross sectional view taken along the line III—III of FIG. 1.
Figure 4:
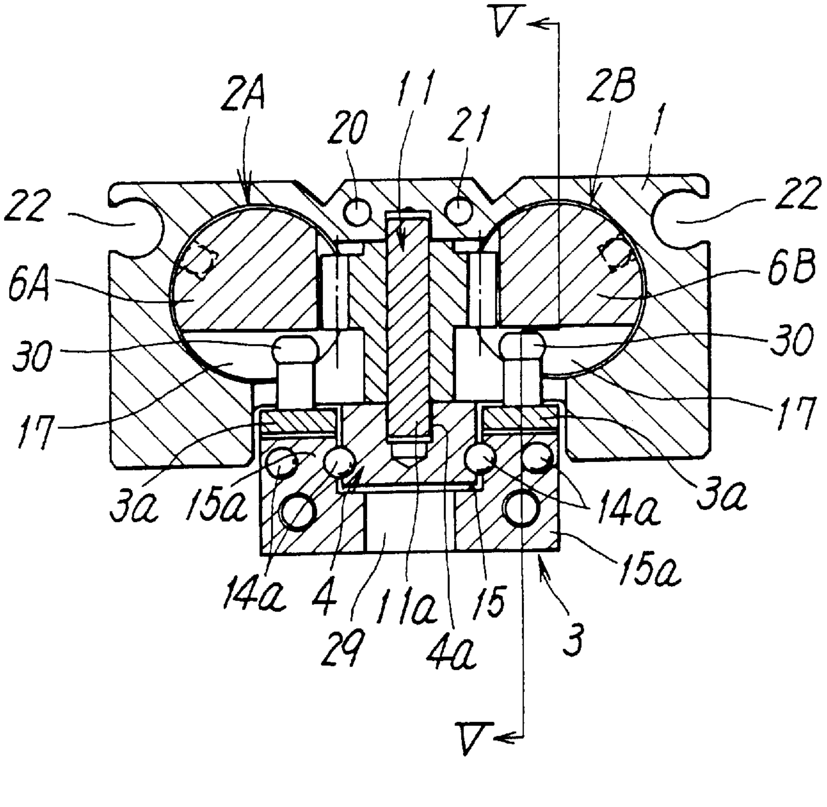
FIG. 4 is a cross sectional view taken along the line IV—IV of FIG. 3, and shows another chuck member.
Figure 5:
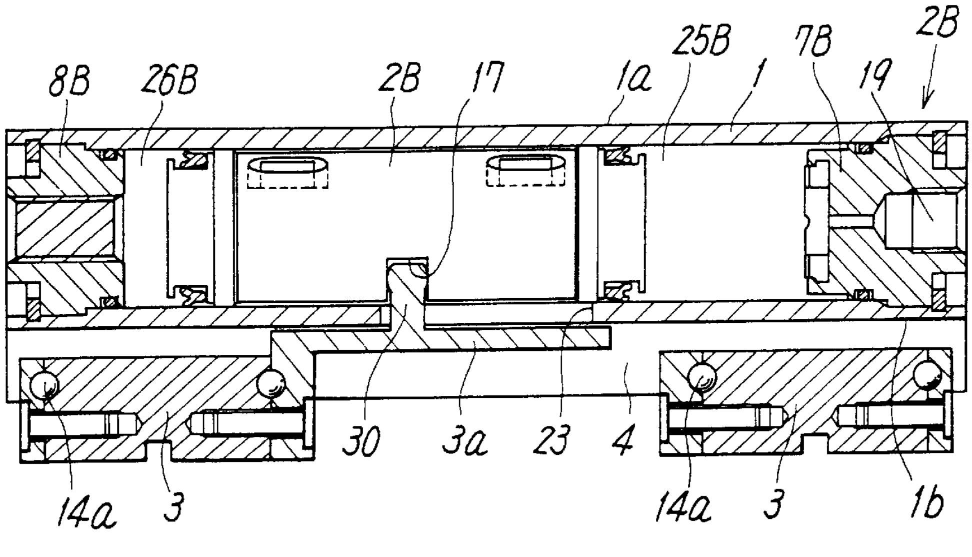
FIG. 5 is a cross sectional view taken along the line V—V of FIG. 4.

In this embodiment, as shown in FIG. 3, when a pressure fluid is supplied from the port 18 positioned on the left-hand side, the pressure fluid flows into a first pressure chamber 25A and a second pressure chamber 26B. More specifically, the pressure fluid flows into the first pressure chamber 25A on the end member 7A side of the left-hand cylinder mechanism 2A and the second pressure chamber 26B on the end member 8B side of the right-hand cylinder mechanism 2B via a passageway 20 from the first pressure chamber 25A. By doing so, each piston is moved toward the position opposite to the position shown in FIG. 3, that is, a direction opposite to each other. In that time, the pressure fluid of a first pressure chamber 25B on the end member 7B side of the cylinder mechanism 2B is discharged from the right-hand port 19. Further, the pressure fluid of a second pressure chamber 26A on the end member 8A side of the cylinder mechanism 2A communicating via a passageway 20 from the first pressure chamber 25B and a passageway 21 is discharged from the right-hand port 19, likewise.

Conversely, when a pressure fluid is supplied from the port 19, the pressure fluid flows into the first pressure chamber 25B of the cylinder mechanism 2B and the second pressure chamber 26A of the cylinder mechanism 2A. Then, the pressure fluid of the first pressure chamber 25A of the left-hand cylinder mechanism 2A and the second pressure chamber 26B of the right-hand cylinder mechanism 2B is discharged from the port 18. By doing so, each of the pistons 6*a* and 6B is driven toward a direction reverse to the above-mentioned case.

The pistons 6A and 6B are individually provided with racks 9A and 9B, which mutually engage with a pinion 11 described later so that their tooth portions face each other. On the other hand, the cylinder holes 5A and 5B are formed with rack openings 10A and 10B for mutually engaging the rack 9A and 9B of the pistons 6A and 6B with the pinion 11, respectively.

Further, both end portions of the pistons 6A and 6B are individually attached with a seal member 16 so that a pressure fluid flows out of the pressure chamber of the cylinder holes 5A and 5B.

In this case, a permanent magnet 27 for positional detection is attached at the vicinity of both end portions of the pistons 6A and 6B. On the other hand, the chuck body 1 is formed with switch attachment grooves 22 and 22 at its outer both sides. By using a magnetic detection switch (not shown) mounted to these attachment grooves 22 and 22, it is possible to detect each operating position of the pistons 6A and 6B.

The chuck body 1 is formed into a shape of substantially rectangular cross section, and has a first surface 1*a* used for fixing to a support body such as a robot arm and a second surface 1*b* opposite to the first surface 1*a*. Further, the chuck body 1 is provided with the slidable pinion 11 between the pair of cylinder mechanisms 2A and 2B at the internally central position. The pinion 11 engages with each of the racks 9A and 9B of the pistons 6A and 6B. The pinion 11 rotates while engaging with the racks 9A and 9B of the pistons 6A and 6B via the rack openings 10A and 10B of the cylinder holes 5A and 5B, and thereby, the operation of these pistons 6A and 6B is synchronized.

The second surface 1*b* of the chuck body 1 is formed with a recess groove 12 along the center axial line of the chuck body. A recess portion 13 for receiving the pinion 11 is formed from the recess groove 12 toward the inside of the chuck body 1. One end portion of an axis 11*a* of the pinion 11 received in the recess portion 13 is rotatably supported to the chuck body 1 at the bottom portion of the recess portion 13.

A guide rail 4 having a rectangular cross section is attached at the widthwise central position of the recess groove 12 in parallel with a moving direction of the pistons 6A and 6B of the cylinder mechanisms 2A and 2B. The pair of chuck members 3 and 3 is arranged at a relative position on the guide rail 4 so as to be movable along the guide rail 4 in a state that they ride on the guide rail 4.

Further, the guide rail 4 is arranged so as to cover the lower surface of the recess portion 13, and has a support hole 4*a* at the recess portion 13. The lower end portion of the axis 11*a* of the pinion 11 is rotatably supported to the support hole 4*a*. By doing so, in the pinion 11, both ends of the axis 11*a* are supported by the chuck body 1 and the guide rail 4 (see FIG. 4). In this case, both ends of the pinion 11 may be supported by the chuck body 1.

The chuck members 3 and 3 individually have a recess groove 15 into which the guide rail 4 is fitted, at the center portion on the upper surface thereof. A linear bearing 14 for smoothly moving the chuck members 3 and 3 is interposed between right and left groove walls 15*a* and 15*a* of the recess groove 15 and outer both surfaces of the guide rail 4. The linear bearing 14 is composed of a plurality of steel balls 14*a*. These steel balls 14*a* are received in a loophole 14*b* so as to freely roll, and the loophole 14*b* is formed into a shape of ellipse extending from the facing surface of the groove walls 15*a* and 15*a* and the outer surface of the guide rail 4 to the inside of the groove walls 15*a* and 15*a*. When the chuck member 3 is moved, each steel ball 14*a* circulates while rotating in the loophole 14*b*.

In this case, the linear bearing 14 is not limited to the circulating type as described above, and may use an arbitrary construction such as a linear type of attaching a plurality of steel balls and cylindrical rolling elements to a groove.

The pair of chuck members 3 and 3 is connected to the pistons 6A and 6B by the following mechanism. More specifically, an arm 3*a* is provided on one of right and left groove walls 15*a* of one chuck member 3 and the counter side groove wall 15*a* of the other chuck member 3. The arm 3*a* extends in parallel with the guide rail 4 and toward another chuck member 3. Each arm 3*a* is provided with a pin 30, which extends from a slot 23 formed on the wall of the cylinder holes 5A and 5B into the cylinder holes 5A and 5B. The pin 30 is fitted into a stopper groove 17 of the pistons 6A and 6B, and then, is abutted against there. The pair of chuck members 3 and 3 is connected individually to the corresponding pistons 6A and 6B via the pin 30 and the arm 3*a*. Therefore, when the pistons 6A and 6B are synchronously moved to the mutually opposite direction by the reaction of pressure fluid, the pair of chuck members 3 and 3 is moved to a mutually closing and separating direction in association with the movement of pistons. By doing so, the pair of chuck members 3 and 3 chucks a workpiece between the attachments mounted thereto, and releases the chucked workpiece.

Each of the arms 3*a* is formed like a thin plate. When the pair of chuck members 3 and 3 is moved to a mutually closing position in order to chuck a workpiece, the arms 3*a* are fitted into a gap between the chuck members 3 and 3 and the lower surface of the chuck body 1 so that they have no interference with each other.

The chuck body 1 is formed with plural, preferably, two stationary holes 28 for fixing the chuck body to a support body such as a robot arm by a screw, in the axial direction of the chuck body 1. These stationary holes 28 are formed one by one at the position covered by the chuck members 3 on the guide rail 4 attached to the center portion of the chuck body 1 so as to communicate with the first surface 1*a* penetrating through the guide rail 4 and the chuck body 1.

On the other hand, the chuck members 3 is formed with work holes 29 for inserting a fixation screw into the stationary hole 28 and screwing it to a support body, at the portion covering the guide rail 4. The work holes 29 are formed so as to correspond to the stationary holes 28 at a specified moving position of the chuck members 3. In this case, the work holes 29 have a size (diameter) enabling a screw head of the fixation screw to pass through there.

Preferably, the above two stationary holes 28 and work holes 29 of the chuck member 3 are formed at a position symmetrical to the pinion 11. By doing so, the pair of chuck members 3 is synchronously moved, and thereby, these stationary holes 28 and work holes 29 are simultaneously aligned in their hole position.

Further, the stationary hole 28 is formed at a position avoiding the pinion 11 and the passageways 20 and 21, and a hole portion 28*b* positioning in the chuck body 1 is formed slightly smaller than a diameter of hole portion 28*a* positioning in the guide rail 4. By doing so, the screw head of the fixation screw is attached in the hole portion 4*a* on the guide rail 4 side in a state of being abutted against an edge of the hole portion 28*b* of the chuck body 1.

The opening and closing chuck having the above construction is formed with the stationary holes 28 at the position overlapping with the chuck member 3 on the guide rail 4. The chuck members 3 and 3 are formed with work holes 29, which are aligned with the stationary holes 28 in its hole position, and further, it is possible to insert a screw into the stationary holes 28 via the chuck members 3. Therefore, there is no need of providing a space for the stationary hole at an end portion near to the chuck body in order to avoid a moving range of the chuck members, like the conventional case. As a result, the chuck body is made into a small size by the space, so that the whole of chuck can be miniaturized.

In addition, the stationary hole 28 is formed at the position on the center axis of the chuck body 1; therefore, it is possible to realize a stable and balanced fixation by using a little fixing portion.

In the above embodiment, a driving force of the cylinder mechanisms 2A and 2B has been transmitted to each of the chuck members 3 by the drive pins 30 and levers 3*a* of the chuck members 3. The present invention is not always limited to the above construction, and of course, the driving force of the cylinder mechanisms may be transmitted to the chuck members by using arbitrary means.

What is claimed is:

1. An opening and closing chuck, characterized by including:

a chuck body having a first surface for fixing to a support body such as a robot arm, and a second surface opposite to the first surface;

a pair of cylinder mechanisms having a pair of cylinder holes formed in the chuck body in parallel with each other, and a pair of pistons freely slidable in the cylinder holes, the pair of pistons being moved to a direction opposite to each other by a reaction of fluid pressure;

a pinion engaging with a rack provided in the pair of pistons, and synchronizing an operation of the pistons by its rotation;

a guide rail positioned on the center portion of the second surface of the chuck body and extending along a moving direction of the pistons;

a pair of chuck members arranged so as to be freely movable along the guide rail in a state of riding on the guide rail at a relative position on the second surface, and moving to a direction opposite to each other in association with the pistons;

a stationary hole formed so as to communicate with the first surface penetrating through the guide rail and the chuck body at a position covered by the chuck members of the guide rail, in order to fix the chuck body to the support body by using a screw; and a work hole formed so as to be aligned with the stationary hole on a specified moving position of the chuck member at a portion covering the guide rail of the chuck member, in order to attach a screw to the stationary hole via the chuck member.

2. The opening and closing chuck according to claim 1, characterized in that two stationary holes and the work hole of the pair of chuck members are formed at a position symmetrical to the pinion, and these stationary holes and work holes are simultaneously aligned with each other in their hole position when the pair of chuck members is synchronously moved.

3. The opening and closing chuck according to claim 1, characterized in that the pair of chuck members individually have a recess groove into which the guide rail is fitted, and one groove wall of one chuck member and a groove wall on the opposite side of the other chuck member are individually provided with an arm extending in parallel with the guide rail, and further, each of the arms is provided with a pin, which extends from a slot formed in a hole wall of the cylinder hole into the cylinder hole so as to be abutted against the piston, and the pair of chuck members is connected to the corresponding piston via the pin and the arm.

4. The opening and closing chuck according to claim 3, characterized in that a plurality of steel balls constituting a linear bearing is interposed between right and left groove walls of the pair of chuck members and the guide rail so as to freely roll.

* * * * *